S. SHALER.

Refrigerator Building.

No. 2,503. Reissued March 12, 1867.

BEST AVAILABLE COPY

Witnesses
Frederick Bartis
R. H. Eddy

Inventor
Nathaniel S. Shaler

United States Patent Office.

NATHANIEL S. SHALER, OF CAMBRIDGE, MASSACHUSETTS.

*Letters Patent No.* 44,664, *dated October* 11, 1864; *reissue No.* 2,503, *dated March* 12, 1867.

IMPROVEMENT IN PRESERVING FRUIT, MEAT, AND OTHER SUBSTANCES.

The Schedule referred to in these Letters Patent and making part of the same.

TO ALL PERSONS TO WHOM THESE PRESENTS SHALL COME:

Be it known that I, NATHANIEL S. SHALER, of Cambridge, Massachusetts, (formerly of Newport, Kentucky,) have made a new and useful invention having reference to the Preservation of Fruits, Meats, and other Perishable Substances; and I hereby declare the same to be fully described and represented in the following specification and drawings.

Figure 1:
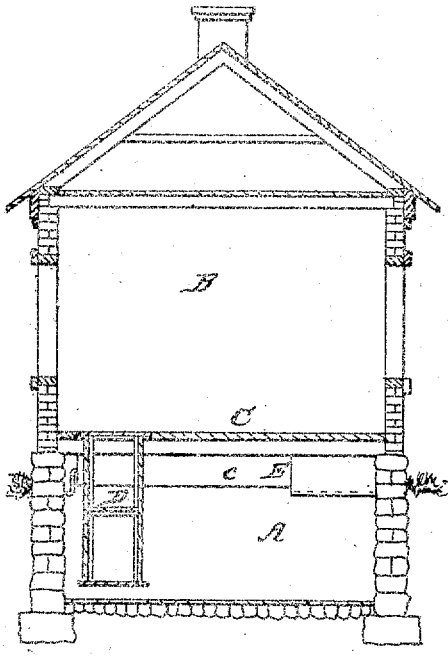
Figures 1 and 2 are vertical sections.
Figure 2:
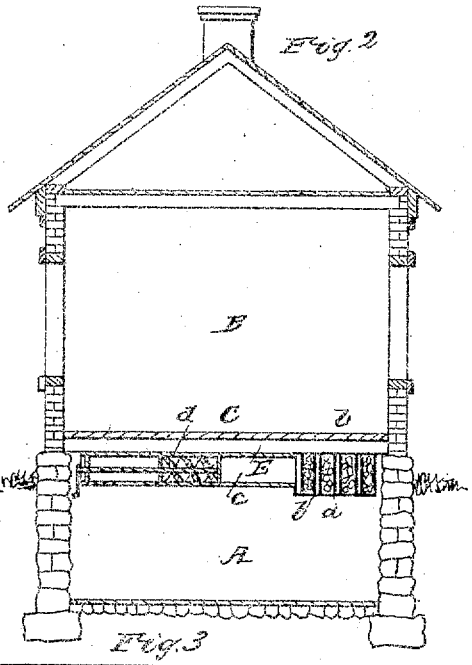
Figure 3:
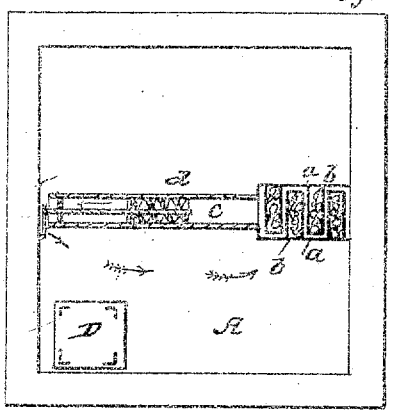
Figure 3 is a horizontal section of a building or preservatory, constructed on the principle of my invention.

The nature of my invention consists in the employment of carbonic acid gas, confined in one or more closed chambers or vessels in which the meats, fruits, or other articles to be preserved from putrefaction or decay are placed or contained, and I find it important and even essential to the best results that the said articles, or the gas containing them, be kept at both a uniform and low temperature, not below freezing. I have herein indicated particular means of obtaining and keeping such a temperature, but other well-known means may be employed with the same result. It is also important, in order to secure the best results, that the presence of water or moisture within the gas-chamber or vessel be prevented, and this is effectually accomplished by the low temperature to which the contents of the gas-containing chamber or vessel is subjected, as herein below shown.

To carry out my invention and employ it on a large scale, the following means are indicated as sufficient and well adapted:

A building of two stories, the sidewalls and main floor of which should be made of good non-conducting material; the lower story of this building to be used for containing the gas and articles to be preserved therein, and made accessible from the upper or second story for the reception and removal of substances to be preserved, by means of shelves or dumb-waiters, so called, arranged and made to pass or slide down into the same through openings cut or made in the floor of the second story room, the said shelves to hold the said substances, and to be provided both at their top and bottom with means of keeping the opening in the floor securely closed, both when the same have been lowered in the gas-chamber and elevated therefrom.

The apparatus for cooling the gas-chamber and preventing the presence of moisture therein may be arranged either within such chamber, or contiguous thereto, in a convenient place. This may be made to consist of a chamber or channel, surrounded by a refrigerating mixture, and having a revolving screw or other mechanism for drawing or forcing the gas through the chamber or channel, and thus circulate it in contact with the cooling surface or surfaces, and so deprive the same of all excess of moisture by freezing or condensing such moisture.

In the drawings, A denotes the lower and B the upper chamber or story of the preservatory building, while C is the floor of the upper chamber. D is a frame or dumb-waiter, arranged in an opening in the floor, and may be provided with suitable well-known mechanical means for raising and depressing the same through the floor. The gas-refrigerating apparatus is represented at E, and consists of a tortuous channel, *a*, surrounding a series of pans or vessels, *b b b*, for containing ice or some refrigerating mixture. The channel *a* leads into a conduit, *c*, containing a rotary screw or fan, *d*, such as when revolved will induce a current of the gas within the conduit and through the tortuous channel. The gas, while passing through the channels, will have its moisture frozen or condensed upon the sides of the channels or the refrigerating cistern or vessels *b b b*.

There are various other ways in which the articles to be preserved may be introduced into or removed from the preserving-chamber. My invention is applicable to navigable vessels and to carriages used for transporting substances from place to place, and it may likewise be employed with decidedly useful though less favorable results, as a means of arresting putrefaction or decay in animal or vegetable matter when the said gas is not subjected to a refrigerating temperature, but is closely confined in tight chambers or vessels filled therewith and containing the articles to be preserved to the exclusion of atmospheric air.

What I claim as my invention, and desire to secure by Letters Patent, is—

1. The preservation of animal, vegetable, or other matter liable to decay in the ordinary atmospheric air and temperature, by means of carbonic acid gas and a refrigerating temperature together, and relatively to such substances, substantially in manner as hereinbefore set forth.

2. Also the combination of a preserving-chamber, *a*, a moisture-refrigerating apparatus, and a means of circulating the carbonic acid gas of such chamber through or so in contact with the surfaces of the refrigerating apparatus as to not only cool the gas but cause such moisture to be frozen or condensed and abstracted from the gas, substantially as specified.

3. Also the preservatory, as constructed of one or more dumb-waiters or elevators, D, or the equivalent thereof, the gas-chamber A, the gas-refrigerating apparatus E, and the gas-circulating apparatus, the whole being arranged and combined substantially as and so to operate in manner and for the purpose specified.

4. I also claim carbonic acid gas as a means of preventing or arresting decay in animal or vegetable matter, when proper buildings or compartments are filled with such gas to the exclusion of atmospheric air, and the substances to be preserved are placed and kept therein for this purpose.

N. S. SHALER.

Witnesses:

GEO. D. NOYES,

F. A. BROOKS.